(12) United States Patent
Adams et al.

(10) Patent No.: US 10,690,554 B2
(45) Date of Patent: Jun. 23, 2020

(54) COMPOSITE AIRSPEED INDICATOR DISPLAY FOR COMPOUND AIRCRAFTS

(71) Applicant: Sikorsky Aircraft Corporation, Stratford, CT (US)

(72) Inventors: David L. Adams, Wallingford, CT (US); Kevin Ron Fimbers, Seymour, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/891,869

(22) Filed: Feb. 8, 2018

(65) Prior Publication Data

US 2019/0112071 A1 Apr. 18, 2019

Related U.S. Application Data

(60) Provisional application No. 62/573,332, filed on Oct. 17, 2017.

(51) Int. Cl.
| | | |
|---|---|---|
| *G01D 7/02* | (2006.01) | |
| *G01L 3/08* | (2006.01) | |
| *B64C 27/08* | (2006.01) | |
| *B64D 43/02* | (2006.01) | |
| *B64D 45/00* | (2006.01) | |
| *G01C 23/00* | (2006.01) | |
| *G05D 1/08* | (2006.01) | |
| *B64C 27/22* | (2006.01) | |

(52) U.S. Cl.
CPC ............... *G01L 3/08* (2013.01); *B64C 27/08* (2013.01); *B64D 43/02* (2013.01); *B64D 45/0005* (2013.01); *G01C 23/005* (2013.01); *B64C 27/22* (2013.01); *G05D 1/0858* (2013.01)

(58) Field of Classification Search
CPC ................................ B64D 43/02; G01C 23/00
See application file for complete search history.

(56) References Cited

U.S. PATENT DOCUMENTS

| | | |
|---|---|---|
| D166,245 S | 3/1952 | Dickey et al. |
| 3,685,360 A * | 8/1972 | Raznov ............... G01C 5/06 73/387 |
| 5,798,713 A | 8/1998 | Viebahn et al. |
| 6,690,299 B1 | 2/2004 | Suiter |
| 6,832,138 B1 | 12/2004 | Straub et al. |
| D513,485 S | 1/2006 | Pfeiffer |
| 7,268,702 B2 | 9/2007 | Chamas et al. |
| 7,295,135 B2 | 11/2007 | Younkin |

(Continued)

OTHER PUBLICATIONS

McKay, Geoff; LearntoFly.ca; "Airspeeds, V-Speeds, Vx, Vy, VsO, Vs1, Va, Vno, Vfe, Vne . . . "; Published Date: Aug. 12, 2010; Accessed Date: Mar. 27, 2019; Available Online at URL: <https://learntofly.ca/airspeeds-v-speeds-vx-vy-vs-vs1-va-vno-vne-vfe/>; 4 Pages.

(Continued)

*Primary Examiner* — Hongmin Fan
(74) *Attorney, Agent, or Firm* — Cantor Colburn LLP

(57) ABSTRACT

An airspeed indicator display for an aircraft having a main rotor system and a translational thrust system includes a first indicator operable to display an actual airspeed of the aircraft and a second indicator positioned adjacent the first indicator. The second indicator is operable to display an actual pitch angle of the translational thrust system.

20 Claims, 5 Drawing Sheets

(56) References Cited

U.S. PATENT DOCUMENTS

| | | | |
|---|---|---|---|
| 7,313,962 | B1 | 1/2008 | O'Neil |
| D589,388 | S | 3/2009 | Sauter |
| 7,765,061 | B1 | 7/2010 | Barber et al. |
| D654,415 | S | 2/2012 | Mizuno |
| D656,440 | S | 3/2012 | Klein |
| 8,354,943 | B2 | 1/2013 | Bacabara et al. |
| 8,421,649 | B2 | 4/2013 | Marstall et al. |
| 8,462,020 | B1 | 6/2013 | Vanhoozer et al. |
| D713,411 | S | 9/2014 | Gall et al. |
| D726,758 | S | 4/2015 | Bourret et al. |
| D733,181 | S | 6/2015 | Manfredo et al. |
| D734,773 | S | 7/2015 | Barbato |
| D741,879 | S | 10/2015 | Chapman et al. |
| 9,233,761 | B2 | 1/2016 | Yamasaki |
| D752,089 | S | 3/2016 | Cru et al. |
| D754,713 | S | 4/2016 | Zhang et al. |
| D763,883 | S | 8/2016 | Kim et al. |
| D766,976 | S | 9/2016 | McElreath |
| D769,927 | S | 10/2016 | Kim et al. |
| D773,532 | S | 12/2016 | Gauci et al. |
| D778,952 | S | 2/2017 | Kim et al. |
| D780,799 | S | 3/2017 | Mehring et al. |
| D790,561 | S | 6/2017 | Torchin et al. |
| 9,674,426 | B2 | 6/2017 | Penha et al. |
| D792,434 | S | 7/2017 | Dzjind et al. |
| D797,116 | S | 9/2017 | Chapman et al. |
| D802,608 | S | 11/2017 | Hicks et al. |
| D805,540 | S | 12/2017 | Kim et al. |
| D809,535 | S | 2/2018 | Park et al. |
| D820,293 | S | 6/2018 | Poel et al. |
| D823,333 | S | 7/2018 | Hiratsuka et al. |
| D834,587 | S | 11/2018 | Torchin et al. |
| D843,381 | S | 3/2019 | Wassell et al. |
| D845,317 | S | 4/2019 | Wellmeier et al. |
| D846,582 | S | 4/2019 | Valladares et al. |
| D847,180 | S | 4/2019 | Wan et al. |
| D847,830 | S | 5/2019 | Chapman et al. |
| D850,479 | S | 6/2019 | Snellman et al. |
| D850,482 | S | 6/2019 | Amini et al. |
| 10,310,724 | B2 | 6/2019 | Kresl et al. |
| D852,820 | S | 7/2019 | Sanchez |
| 2004/0125587 | A1 | 7/2004 | Wada et al. |
| 2005/0143871 | A1* | 6/2005 | Boorman ............... G01C 23/00 701/3 |
| 2005/0222766 | A1 | 10/2005 | Burch |
| 2005/0262451 | A1 | 11/2005 | Remignanti et al. |
| 2009/0121901 | A1 | 5/2009 | Namier et al. |
| 2009/0281684 | A1 | 11/2009 | Spek |
| 2010/0157742 | A1 | 6/2010 | Relyea et al. |
| 2010/0302073 | A1* | 12/2010 | Fernandez ............. G01D 7/002 340/959 |
| 2011/0063137 | A1* | 3/2011 | Pimouguet ......... G05B 23/0272 340/963 |
| 2011/0205090 | A1 | 8/2011 | Marstall et al. |
| 2011/0213514 | A1 | 9/2011 | Baxter |
| 2012/0105318 | A1 | 5/2012 | Nutaro et al. |
| 2012/0159370 | A1 | 6/2012 | Rode et al. |
| 2012/0299753 | A1 | 11/2012 | Thoreen |
| 2013/0226375 | A1 | 8/2013 | Peter et al. |
| 2013/0346858 | A1 | 12/2013 | Neyrinck |
| 2014/0059482 | A1 | 2/2014 | Won |
| 2014/0339372 | A1 | 11/2014 | Dekel ................. B64C 29/0033 244/7 R |
| 2016/0059960 | A1* | 3/2016 | Fearn ................... B64C 27/022 244/17.11 |
| 2016/0147406 | A1 | 5/2016 | Yi |
| 2016/0179327 | A1 | 6/2016 | Zammit-Mangion et al. |
| 2017/0088284 | A1* | 3/2017 | Holder .................. B64D 45/00 |
| 2019/0113403 | A1 | 4/2019 | Adams et al. |

OTHER PUBLICATIONS

Youtube.Com; "Learn to Use QT Design Studio . . . 0:15"; Published Date: Jun. 26, 2018; Accessed Date: Mar. 27, 2019; Available Online at URL: <https://www.youtube.com/watch?v=U91nAFReAoU>; 1 Page.

"Abstract future, concept vector . . . " despositphotos.com. Uploaded Jul. 16, 2016. Accessed Jul. 13, 2019. Available online at URL: https://depositphotos.com/115709468/stock-illustration-abstract-future-concept-vector-futurustic.html (Year:2016); p. 1 of 1.

"File: FGGC.jpg." wiki.flightgear.org. May 9, 2009. Accessed Jul. 13, 2019. Available online at URL: http://wiki.flightgear.org/ File: FGGC.jpg (Year: 2009); p. 1 of 1.

"File: PFD 20180406.png." wiki.flightgear.org. Apr. 6, 2018. Accessed Jul. 13, 2019. Available online at URL: http://wiki.flightgear.org/ File: PRD_20180406.png (Year: 2018); p. 1 of 1.

* cited by examiner

COMPOSITE AIRSPEED INDICATOR DISPLAY FOR COMPOUND AIRCRAFTS

CROSS-REFERENCE TO RELATED APPLICATIONS

This application claims the benefit of U.S. Provisional Application Ser. No. 62/573,332, filed Oct. 17, 2017, which is incorporated herein by reference in its entirety.

BACKGROUND

The present disclosure relates to a display system of a rotary wing aircraft, and more particularly, to systems and methods for enhanced graphical display of operational parameters of a compound, coaxial rotary wing aircraft, with a variable pitch propulsor.

Computer generated aircraft displays have become highly sophisticated and are capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays to display important flight management, navigation, and control information to personnel operating the aircraft.

Primary Flight Displays are computer-generated displays that provide flight crews with real-time visual representations of the operational states of their aircraft during flights. For example, the Primary Flight Display can combine critical flight instrumentation (e.g., altitude, attitude, heading, airspeed, vertical speed instruments) and primary engine instrument indicators into a single, readily interpretable display. As a result, Primary Flight Displays have become effective visual tools for controlling aircraft, reducing pilot workload, increasing situational awareness, and improving overall flight safety.

Conventional displays typically provide information related o engine torque and rotor torque as parameters related to aircraft performance. Compound helicopters, however, typically utilize not only a dual main rotor, but also an auxiliary propulsor. Because the auxiliary propulsor is operable to vary aircraft airspeed, parameters associated with the auxiliary propulsor must also be monitored. Accordingly, the engine torque, torque of both main rotors, and the torque of the auxiliary propulsor must be incorporated into the display. Inclusion of these parameters requires additional display indicators and additional display space allocation, resulting in increased pilot scan times when flying the aircraft.

BRIEF DESCRIPTION

According to an embodiment, an airspeed indicator display for an aircraft having a main rotor system and a translational thrust system includes a first indicator operable to display an actual airspeed of the aircraft and a second indicator positioned adjacent the first indicator. The second indicator is operable to display a second parameter associated with the translational thrust system.

In addition to one or more of the features described above, or as an alternative, in further embodiments the first indicator is a dial having a first radius and the second indicator is an arc extending about a portion of a periphery of the first indicator, the second indicator having a second radius, the second radius being larger than the first radius.

In addition to one or more of the features described above, or as an alternative, in further embodiments the first indicator is operable to additionally provide a reference airspeed of the aircraft.

In addition to one or more of the features described above, or as an alternative, in further embodiments the second parameter displayed by the second indicator is an actual pitch angle and the second indicator is operable to additionally provide a reference pitch angle of the translational thrust system.

In addition to one or more of the features described above, or as an alternative, in further embodiments comprising a third indicator operable to display a digital, numerical readout of the second indicator.

In addition to one or more of the features described above, or as an alternative, in further embodiments the airspeed indicator is operable to display an operational status of the translational thrust system.

In addition to one or more of the features described above, or as an alternative, in further embodiments a color of the second indicator varies in response to an operational mode of the translational thrust system.

In addition to one or more of the features described above, or as an alternative, in further embodiments a first color of the second indicator indicates that the translational thrust system is operational and a second color of the second indicator indicates that the translational thrust system is non-operational.

In addition to one or more of the features described above, or as an alternative, in further embodiments a third color of the second indicator indicates that the translational thrust system is transforming between operational and non-operational.

In addition to one or more of the features described above, or as an alternative, in further embodiments the airspeed indicator is a portion of a multifunction display unit.

According to another embodiment, a method of using an airspeed indicator includes indicating an actual airspeed of the aircraft at a first gage of a first display and indicating a parameter associated with a translational thrust system of the aircraft at a second gage of the first display. The second gage is positioned adjacent the first gage.

In addition to one or more of the features described above, or as an alternative, in further embodiments the parameter associated with the translational thrust system of the aircraft includes a pitch angle of a plurality of blades of the translational thrust system.

In addition to one or more of the features described above, or as an alternative, in further embodiments the parameter associated with the translational thrust system of the aircraft includes a percentage of available thrust.

In addition to one or more of the features described above, or as an alternative, in further embodiments comprising indicating a digital readout of the parameter associated with the translational thrust system.

In addition to one or more of the features described above, or as an alternative, in further embodiments the digital readout is arranged directly adjacent the second gage.

In addition to one or more of the features described above, or as an alternative, in further embodiments comprising indicating an operational status of the translational thrust system.

In addition to one or more of the features described above, or as an alternative, in further embodiments indicating an operational status of the translational thrust system includes varying a color of at least one of the second gage and the digital readout in response to the operational status of the translational thrust system.

In addition to one or more of the features described above, or as an alternative, in further embodiments when at least one of the second gage and the digital readout is a first color, a clutch operable to provide power from an engine of the aircraft to the translational thrust system is engaged.

In addition to one or more of the features described above, or as an alternative, in further embodiments when at least one of the second gage and the digital readout is a second color, the clutch is disengaged.

In addition to one or more of the features described above, or as an alternative, in further embodiments when at least one of the second gage and the digital readout is a third color, the clutch is transforming between an engaged and disengaged configuration.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
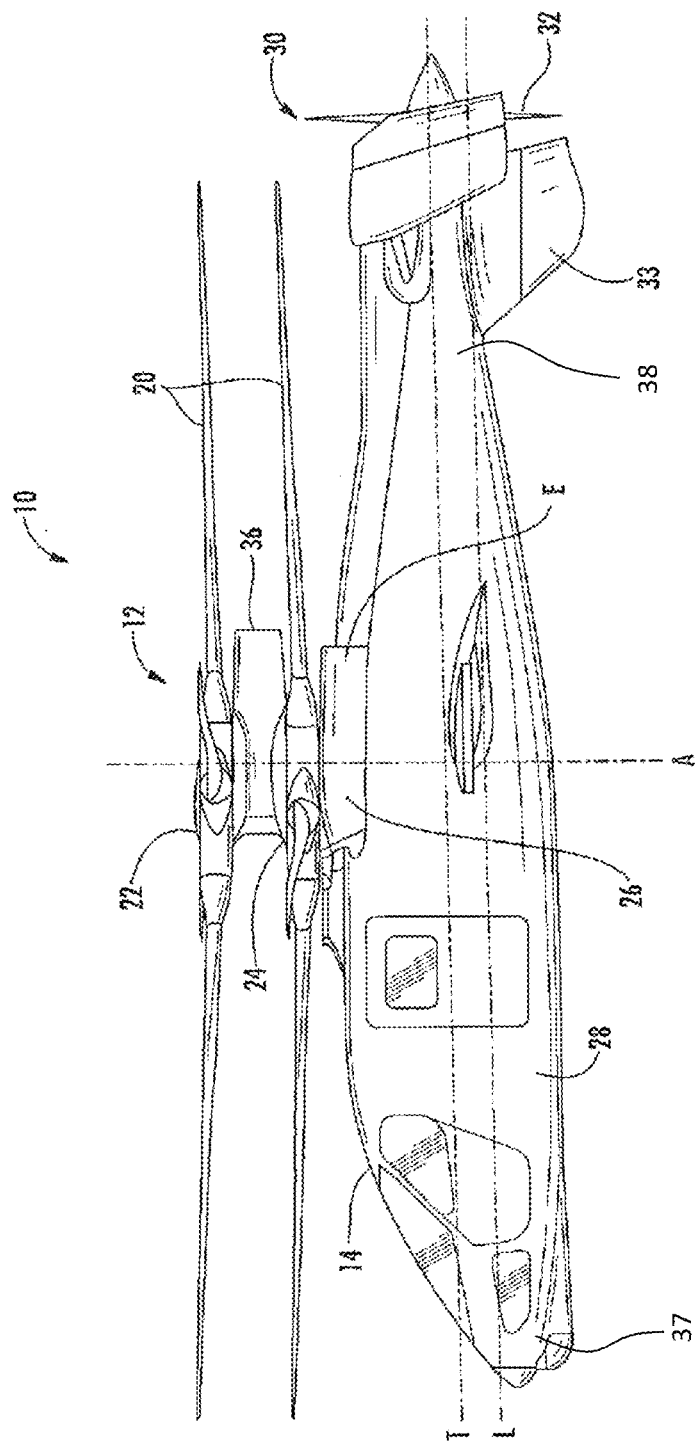
FIG. 1 is side view of an example of a rotary wing aircraft.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in this non-limiting embodiment, other rotary-wing aircraft will also benefit from embodiments of the invention.

The dual, counter-rotating, coaxial rotor system 12 includes an upper rotor system and a lower rotor system. Rotor system 12 includes a plurality of rotor blades 20 mounted to a rotor hub 22, 24 for rotation about rotor axis of rotation A. A plurality of the main rotor blades 20 project substantially radially outward from the hubs 22, 24. Any number of blades 20 may be used with the rotor system 12. The rotor system 12 includes a rotor hub fairing 36 generally located between and around the upper and lower rotor systems such that the rotor hubs 22, 24 are at least partially contained therein. The rotor hub fairing 36 provides drag reduction.

A main gearbox 26 may be located above the aircraft cabin 28 and drives the rotor system 12. The translational thrust system 30 may be driven by the same main gearbox 26 which drives the rotor system 12. The main gearbox 26 is driven by one or more engines (illustrated schematically at E).

The translational thrust system 30 may be mounted to the rear of the airframe 14 with a translational thrust axis, T, oriented substantially horizontal and parallel to the aircraft longitudinal axis L to provide thrust for high-speed flight. The translational thrust system 30 includes a pusher propeller 32 mounted at an aerodynamic tail fairing 33. The translational thrust axis T, corresponds to the axis of rotation of propeller 32. Although a tail mounted translational thrust system 30 is disclosed in this illustrated non-limiting embodiment, it should be understood that any such system or other translational thrust systems may alternatively or additionally be utilized.

Figure 2:
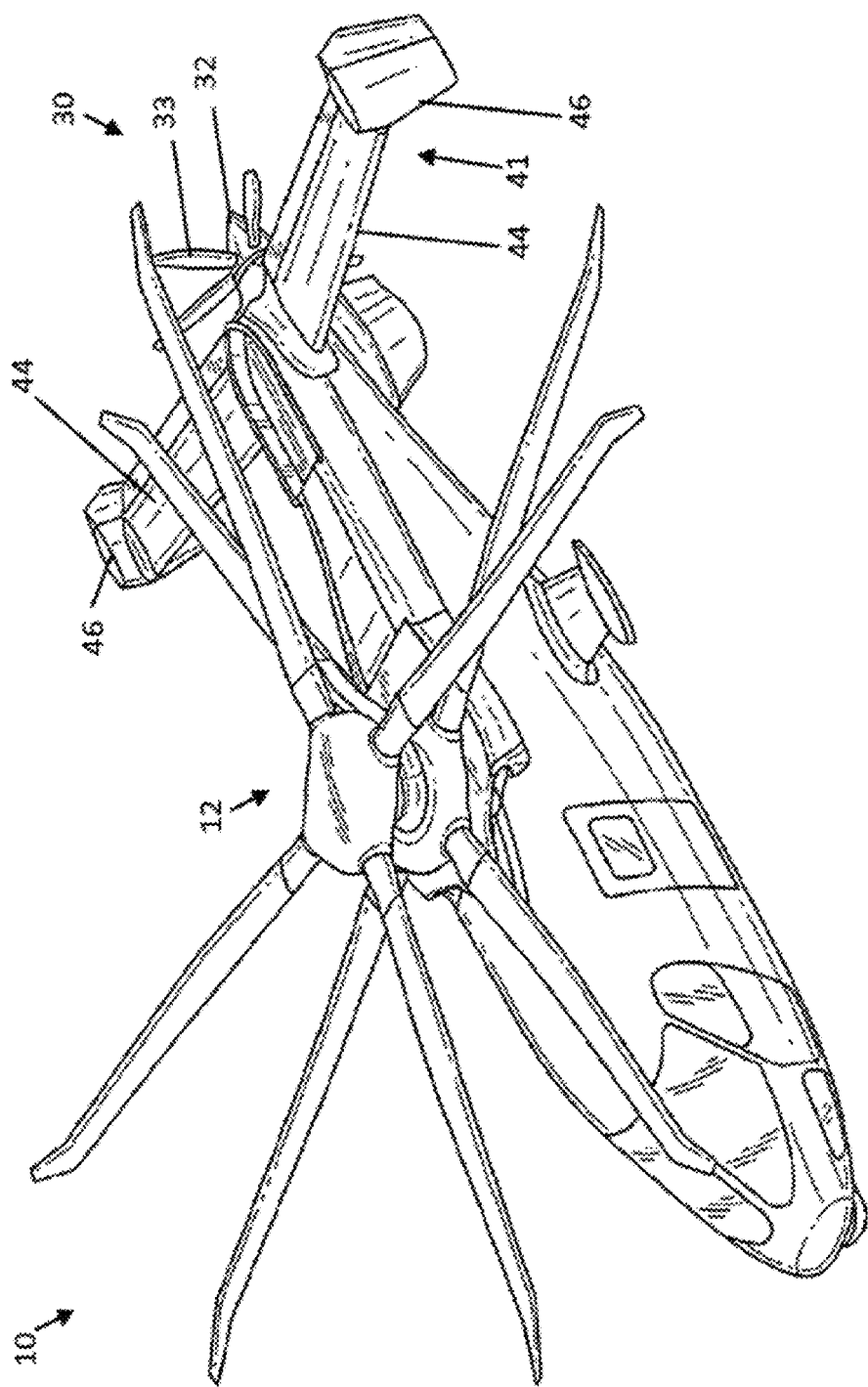
FIG. 2 is a perspective view of the rotary wing aircraft of FIG. 1.

In the example of FIGS. 1 and 2, the auxiliary propulsor 32 includes a plurality of propeller blades 33 and is positioned at a tail section 41 of the aircraft 10. The tail section 41 includes active elevators 44 and active rudders 46 as controllable surfaces, as best seen in FIG. 2. During flight regimes, aircraft pitch attitude and longitudinal velocity demands (i.e., speed) can change independently. Exemplary embodiments control both the main rotor system 12 and the translational thrust system 30 to support a range of aircraft pitch attitudes over a range of aircraft airspeeds.

Figure 3:
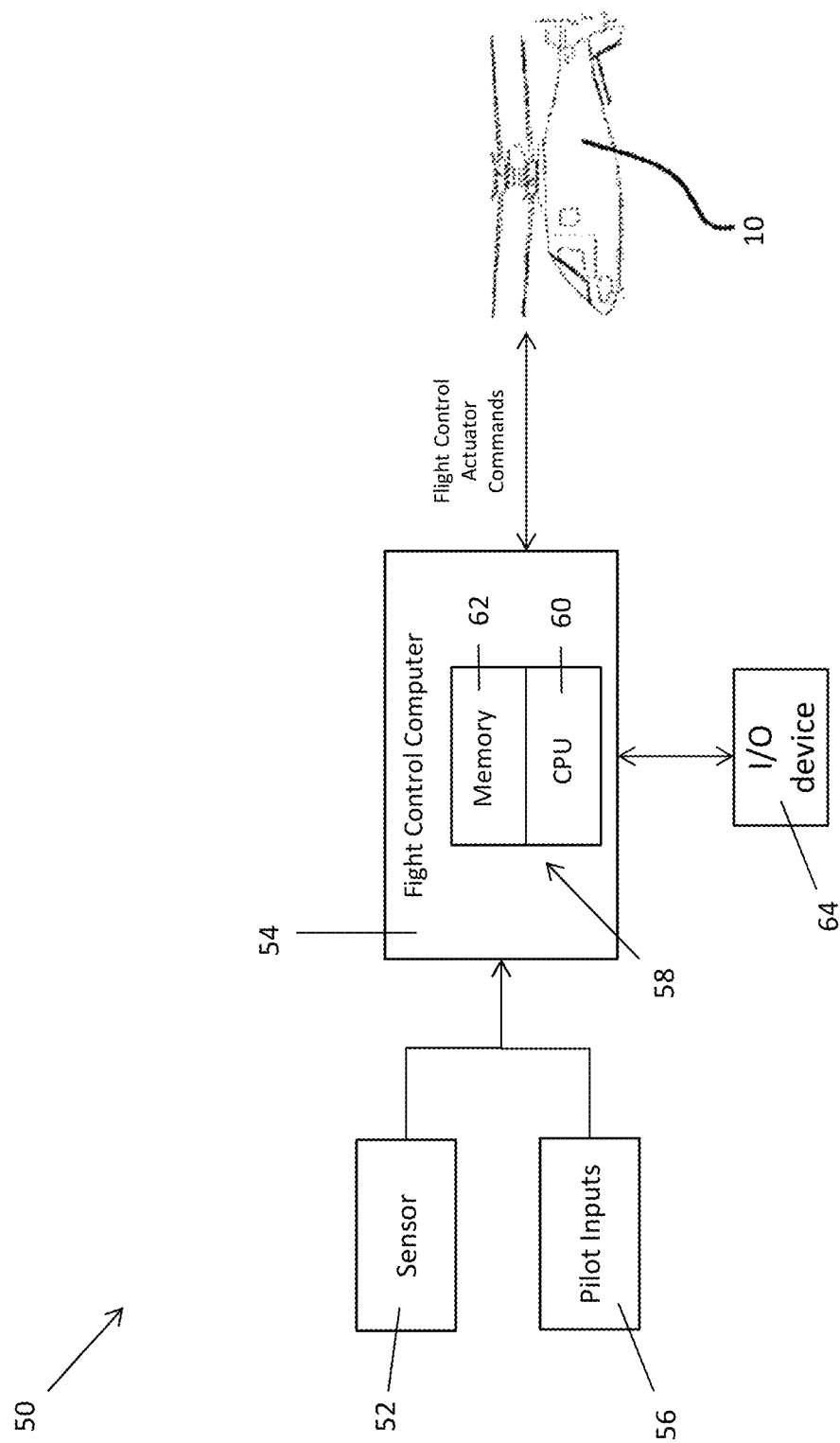
FIG. 3 is a schematic diagram of a control system of a rotary wing aircraft.

FIG. 3 illustrates an example of a control system 50 of an aircraft, such as aircraft 10. In one embodiment, the flight control system 50 is a fly-by-wire (FBW) control system. In a FBW control system, there is no direct mechanical coupling between a pilot's controls and movable components such as rotor blade assemblies 20 or propeller blades 34 of the aircraft 10 of FIG. 1. Instead of using mechanical linkages, a FBW control system 50 includes a plurality of sensors 52 which can sense the position of controlled elements and generate electrical signals proportional to the sensed position. The sensors 52 may also be used directly and indirectly to provide a variety of aircraft state data to a flight controller (FCC) 54. Examples of flight conditions of the aircraft measured by the sensors 52, include, but are not limited to, main rotor rotational speed, rotor torque, rotor blade pitch, propeller rotational speed, propeller torque, airspeed, and thrust for example.

Pilot commands or inputs 56 from pilot inceptors (not shown) are received by the flight controller 54 as a commanded change to one or more components of the aircraft, such as the main rotor system or the translational thrust system for example. Pilot inputs 56 can be in the form of stick commands and/or beeper commands to set and incrementally adjust reference values for controllers. The pilot inputs 56 need not be directly provided by a human pilot, but may be driven by an automatic pilot, a remote control, a navigation-based control, or one or more control loops configured to produce one or more values used to pilot the aircraft 10.

In response to inputs from the sensors 52 and pilot inputs 56, the FCC 54 transmits signals to various subsystems of the aircraft 10, such as the main rotor system 12 and the translational thrust system 30. In an embodiment, rather than simply passing pilot inputs 56 to various subsystems, a processing system 58 operably coupled to or integrated with the FCC 54 applies models and control laws to augment the flight control actuator commands provided to one or more servos or actuators of the aircraft 10.

The processing system 58 includes processing circuitry 60, memory 62, and an interface with at least one input/output device 64. The processing circuitry 60 can be any type or combination of computer processors, such as a microprocessor, microcontroller, digital signal processor, application specific integrated circuit, programmable logic device, and/or field programmable gate array, and is generally referred to as central processing unit (CPU). The memory 62 can include volatile and non-volatile memory, such as random access memory (RAM), read only memory (ROM), or other electronic, optical, magnetic, or any other computer readable storage medium onto which data and control logic as described herein are stored. Therefore, the memory 62 is a tangible storage medium where instructions executable by the processing circuitry 60 are embodied in a non-transitory form.

The I/O device 64 may be used to present information to, and/or receive input selections from, a user (e.g., a pilot). The at least one I/O device 64 may include a display device or screen, audio speakers, a graphical user interface (GUI), etc. It is to be appreciated that the control system 50 is intended as an example only illustrative. In some embodiments, additional components or entities not shown in FIG. 3 may be included. In some embodiments, one or more of the components or entities may be optional. In some embodiments, the components or entities of the control system 50 may be arranged or configured differently from what is shown in FIG. 3.

Figure 4:
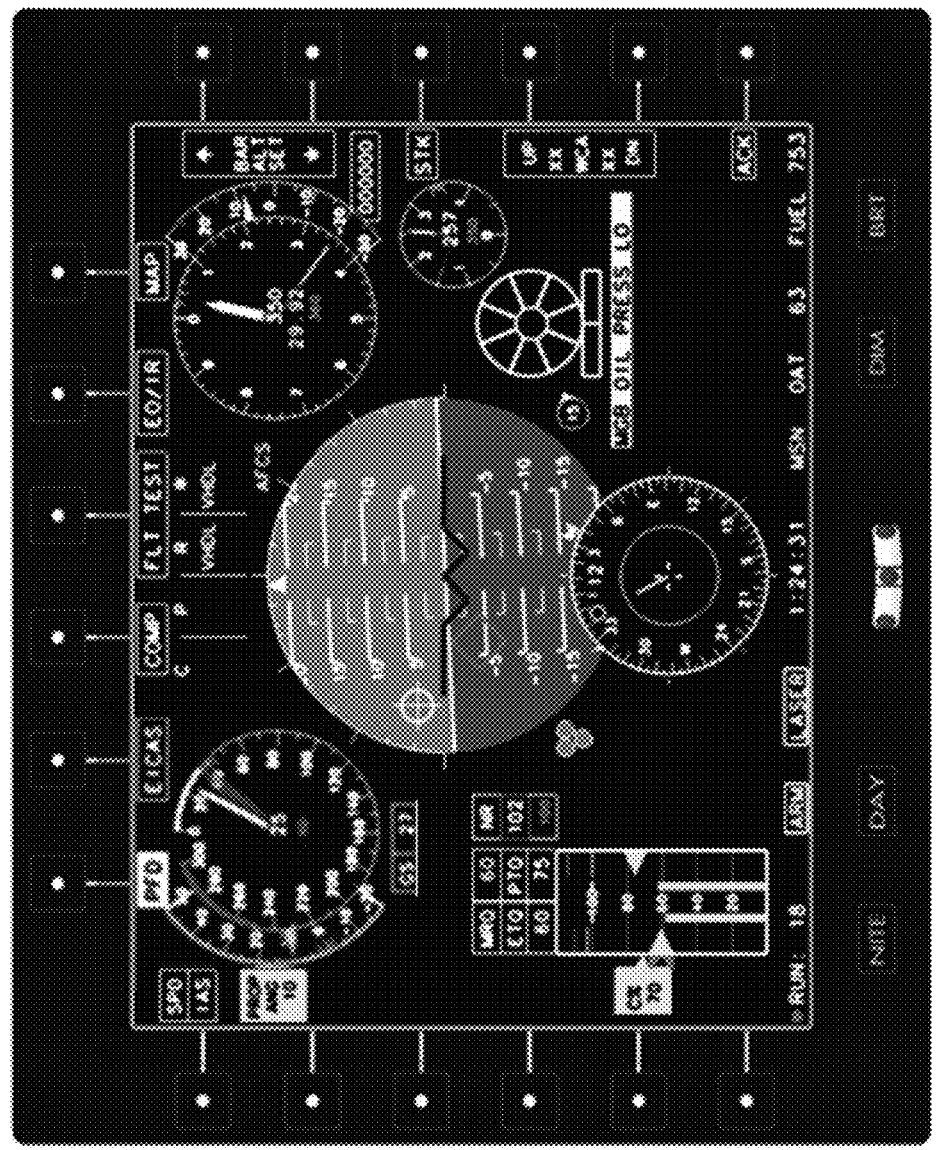
FIG. 4 is a front view of a multifunction display system of a rotary wing aircraft according to an embodiment.

With reference now to FIG. 4, an example of an input/output device 64 of the control system 50 is illustrated in more detail. In an embodiment, the device 64 is a display unit, such as disposed within the cockpit of the aircraft 10 for example. The display unit 64 may be located in front of one of the pilot and copilot, or alternatively, may be located at a position between the pilot and the copilot. In some embodiments, the display unit 64 is supported by an instrument console, while in other embodiments the display unit 64 may be a separate component independently mounted in the cockpit. In yet another embodiment, the display unit 64 may be visible in a windshield of the aircraft 10, such as via a heads up display for example. In the illustrated, non-limiting embodiment, the display unit 64 includes a multifunction display and includes a plurality of distinct display features, each of which is configured to provide an operator with one or more operating parameters of the aircraft.

Figure 5:
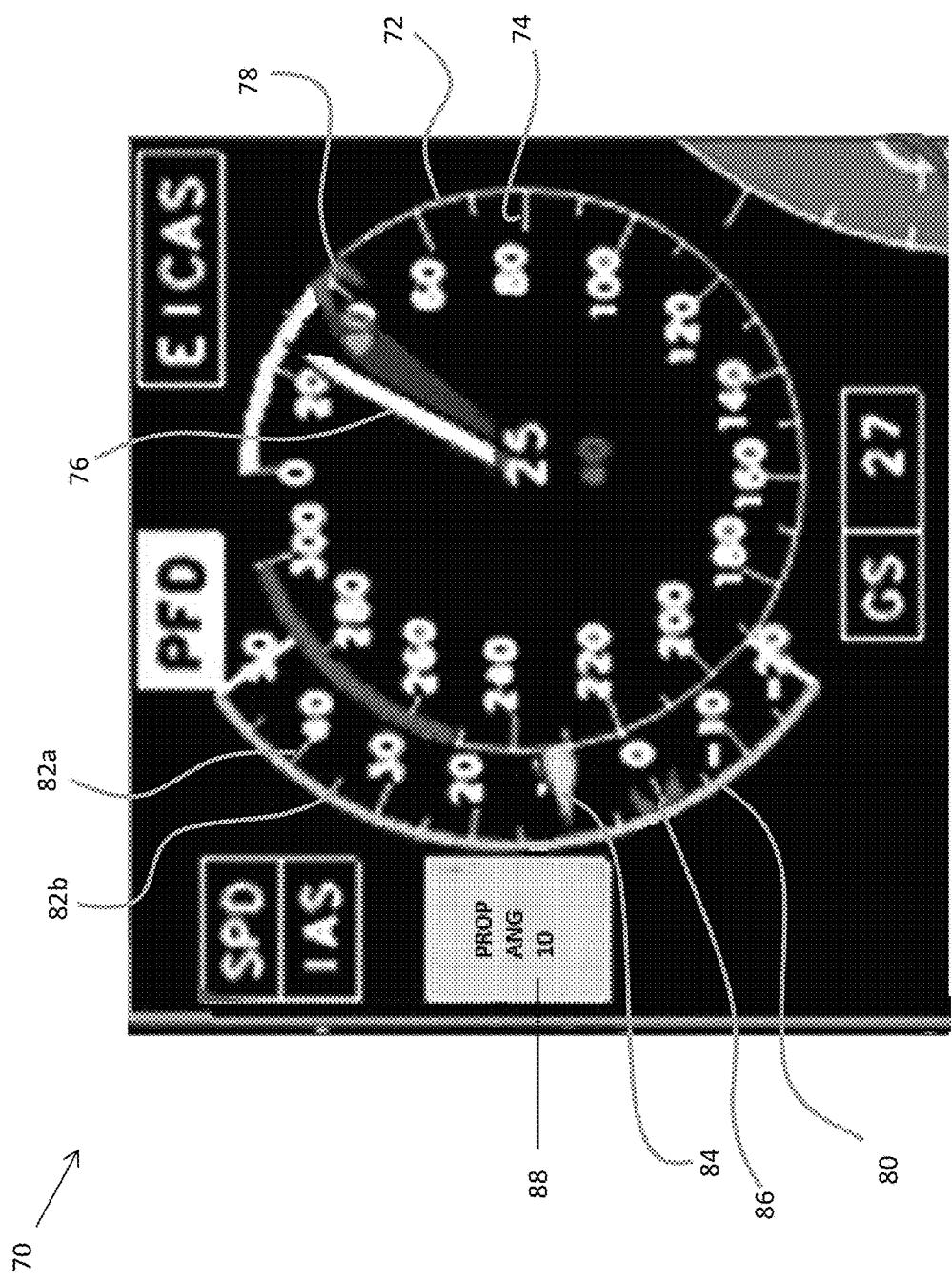
FIG. 5 is a front view of an airspeed indicator of the display system of FIG. 4 according to an embodiment.

With reference now to FIG. 5, a first display 70 of the display unit 64 includes an airspeed indicator configured to visually indicate not only an airspeed of the aircraft 10, but also the operational status and pitch angle of the blades 33 of the translational thrust system 30. In the illustrated, non-limiting embodiment, the airspeed indicator 70 includes a circular dial 72 having a plurality of markings 74 arranged at intervals about the circumference of the dial 72. Each of the markings 74 represents an incremental change in the value of the airspeed, such as 10 or 20 nautical miles per hour for example. A pointer 76 extending from the origin of the dial 72 is movable about the dial 72 to indicate an actual airspeed of the aircraft 10, as measured by one or more sensors 52 of the control system 50. A symbol 78 located about the periphery of the dial 72 may similarly indicate to a user the commanded reference airspeed. The commanded reference airspeed may be determined in response to a pilot input 56 for example.

A secondary indicator in the form of an arc 80 is formed adjacent a portion of the dial 72. As shown, a radius of the secondary arc 80 is greater than a radius of the dial 72 such that the secondary arc 80 is offset from the dial 72 by a distance. Further, although the secondary arc 80 is shown as extending about 90 degrees about the circumference of the dial 72, embodiments where the arc 80 extends about any portion of the dial 72 are within the scope of the disclosure.

The secondary arc 80 similarly includes a plurality of markings 82 spaced at intervals or all or a portion of the length of the arc 80. The markings 82 may include major markings 82a and minor markings 82b representing different degrees of change with respect to a pitch angle. Although the secondary arc 80 is being used to display pitch angle in the illustrated embodiment, embodiments where the secondary arc is used to display another operating parameter of the aircraft 10, such as percentage of available thrust for example, are also contemplated herein. The minor markings 82b are disposed between adjacent major markings 82a, and therefore represent a smaller change in pitch angle than the major markings 82a. In an embodiment, the major markings 82a represent a change in pitch angle for example 10 degrees, and the minor markings 82b represent a change in pitch angle of for example 5 degrees. However, any suitable configuration of markings 82 representing any change in pitch angle is contemplated herein.

A needle 84 associated with the secondary arc 80 is movable about the arc 80 to indicate an actual pitch angle of the blades 33 of the translational thrust system 30 as measured by one or more sensors 52 of the control system 50. A symbol 86, also movable about the arc 80, is operable to indicate the commanded pitch of the thrust system 30, as determined by the one or more pilot inputs 56 provided to the control system 50 for example. It should be understood that the dial 72 and secondary arc 80 illustrated and described herein are intended as an example only and that other configurations for graphically representing the airspeed and pitch angle, such as via a linear gage for example, are also contemplated herein.

In the illustrated, non-limiting embodiment, a box 88 is located directly adjacent the secondary arc 80. The box 88 additionally provides a digital, numerical readout of the actual pitch of the translational thrust system 30 as measured by one or more sensors 52 of the control system 50. Accordingly, the box 88 adjacent the secondary arc 80 and the pointer 84 associated with the secondary arc 80 provide a numerical and graphical representation of the actual pitch angle of the translational thrust system 30, respectively.

The coloring of at least one of the secondary arc 80, the pointer 84, and the box 88 may vary to indicate a condition of the translational thrust system 30. In an embodiment, the coloring of at least one of the secondary arc 80, the pointer 84, and the box 88 is configured to indicate to an operator a status of a clutch or gearbox (not shown) operable to selectively provide power to the translational thrust system 30. In an embodiment, the secondary arc 80 is a first color, such as green for example, when the clutch is engaged and power from an engine E of the aircraft 10 is being provided to the translational thrust system 30, and the secondary arc 80 is a second color, such as white for example, when the clutch is disengaged and no power is being provided to the translational thrust system 30. In an embodiment, the secondary arc 80 is a third color, such as yellow for example, when the clutch is transforming between an engaged and disengaged configuration. Although the variation is color is described with respect to the secondary arc 80, it should be understood that embodiments where each of the secondary arc 80, the pointer 84, and the box 88 vary in color are contemplated herein. In such embodiments, the color of the secondary arc 80, the pointer 84, and the box 88 change simultaneously.

The airspeed indicator 70 illustrated and described herein provides improved situational awareness to an operator of the aircraft 10 with respect to the aircraft thrust settings and the effect of the thrust settings on airspeed of the aircraft 10.

As a result, use of the airspeed indicator 70 may reduce or even minimize pilot scan times.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airspeed indicator display for an aircraft having a main rotor system and a translational thrust system comprising:
   a first indicator operable to display an actual airspeed of the aircraft, wherein the first indicator includes a first graphical display including a first pointer; and
   a second indicator positioned adjacent the first indicator, the second indicator being operable to display a second parameter associated with the translational thrust system, wherein the second indicator includes a second graphical display including a second pointer, the second pointer being located at a position offset from the first pointer.

2. The airspeed indicator of claim 1, wherein the first indicator is a dial having a first radius and the second indicator is an arc extending about a portion of a periphery of the first indicator, the second indicator having a second radius, the second radius being larger than the first radius.

3. The airspeed indicator of claim 1, wherein the first indicator is operable to additionally provide a reference airspeed of the aircraft.

4. The airspeed indicator of claim 1, wherein the second parameter displayed by the second indicator is an actual pitch angle and the second indicator is operable to additionally provide a reference pitch angle of the translational thrust system.

5. The airspeed indicator of claim 1, further comprising a third indicator operable to display a digital, numerical readout of the second indicator.

6. The airspeed indicator of claim 1, wherein the airspeed indicator is operable to display an operational status of the translational thrust system.

7. The airspeed indicator of claim 6, wherein a color of the second indicator varies in response to an operational mode of the translational thrust system.

8. The airspeed indicator of claim 7, wherein a first color of the second indicator indicates that the translational thrust system is operational and a second color of the second indicator indicates that the translational thrust system is non-operational.

9. The airspeed indicator of claim 8, wherein a third color of the second indicator indicates that the translational thrust system is transforming between operational and non-operational.

10. The airspeed indicator of claim 1, wherein the airspeed indicator is a portion of a multifunction display unit.

11. A method of using an airspeed indicator comprising:
    indicating an actual airspeed of the aircraft at a first gage of a first display, wherein the first gage includes a graphical display having a first pointer; and
    indicating a parameter associated with a translational thrust system of the aircraft at a second gage of the first display, the second gage being positioned adjacent the first gage, wherein the second gage includes a graphical display having a second pointer, the second pointer being located at a position offset from the first pointer.

12. The method of claim 11, wherein the parameter associated with the translational thrust system of the aircraft includes a pitch angle of a plurality of blades of the translational thrust system.

13. The method of claim 11, wherein the parameter associated with the translational thrust system of the aircraft includes a percentage of available thrust.

14. The method of claim 11, further comprising indicating a digital readout of the parameter associated with the translational thrust system.

15. The method of claim 14, wherein the digital readout is arranged directly adjacent the second gage.

16. The method of claim 14, further comprising indicating an operational status of the translational thrust system.

17. The method of claim 16, wherein indicating an operational status of the translational thrust system includes varying a color of at least one of the second gage and the digital readout in response to the operational status of the translational thrust system.

18. The method of claim 17, wherein when at least one of the second gage and the digital readout is a first color, a clutch operable to provide power from an engine of the aircraft to the translational thrust system is engaged.

19. The method of claim 18, wherein when at least one of the second gage and the digital readout is a second color, the clutch is disengaged.

20. The method of claim 19, wherein when at least one of the second gage and the digital readout is a third color, the clutch is transforming between an engaged and disengaged configuration.

* * * * *